(12) United States Patent
Harnetiaux

(10) Patent No.: US 7,263,938 B2
(45) Date of Patent: Sep. 4, 2007

(54) COLLAPSIBLE GRAIN CHUTE

(75) Inventor: Travis Harnetiaux, Woodridge, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/560,697

(22) Filed: Nov. 16, 2006

(65) Prior Publication Data
US 2007/0095262 A1 May 3, 2007

Related U.S. Application Data

(62) Division of application No. 10/855,266, filed on May 27, 2004, now Pat. No. 7,156,029.

(51) Int. Cl.
*A01C 7/00* (2006.01)
*A01C 9/00* (2006.01)

(52) U.S. Cl. ...................................... 111/174

(58) Field of Classification Search ................ 111/170, 111/174–176, 186
See application file for complete search history.

(56) References Cited

U.S. PATENT DOCUMENTS

| | | | |
|---|---|---|---|
| 4,122,932 A | 10/1978 | Neubert et al. | |
| 4,139,155 A | 2/1979 | Hastings | |
| 4,603,769 A | 8/1986 | Bach et al. | |
| 4,669,945 A | 6/1987 | Pollard et al. | |
| 5,161,473 A | 11/1992 | Landphair et al. | |
| 5,193,586 A | 3/1993 | Nolin, Jr. | |
| 5,379,706 A | 1/1995 | Gage et al. | |
| 5,428,947 A | 7/1995 | Visser | |
| 6,047,652 A | 4/2000 | Prairie et al. | |

*Primary Examiner*—Christopher J. Novosad
(74) *Attorney, Agent, or Firm*—Rebecca Henkel

(57) ABSTRACT

A generally conically-shaped collapsible grain chute removably affixed to the bulk seed distributor of an agricultural planter to provide an effective and efficient apparatus for emptying the bulk seed bin. The chute may include a cinch cord to selectively open and close the chute to control the flow of seed therethrough.

7 Claims, 5 Drawing Sheets

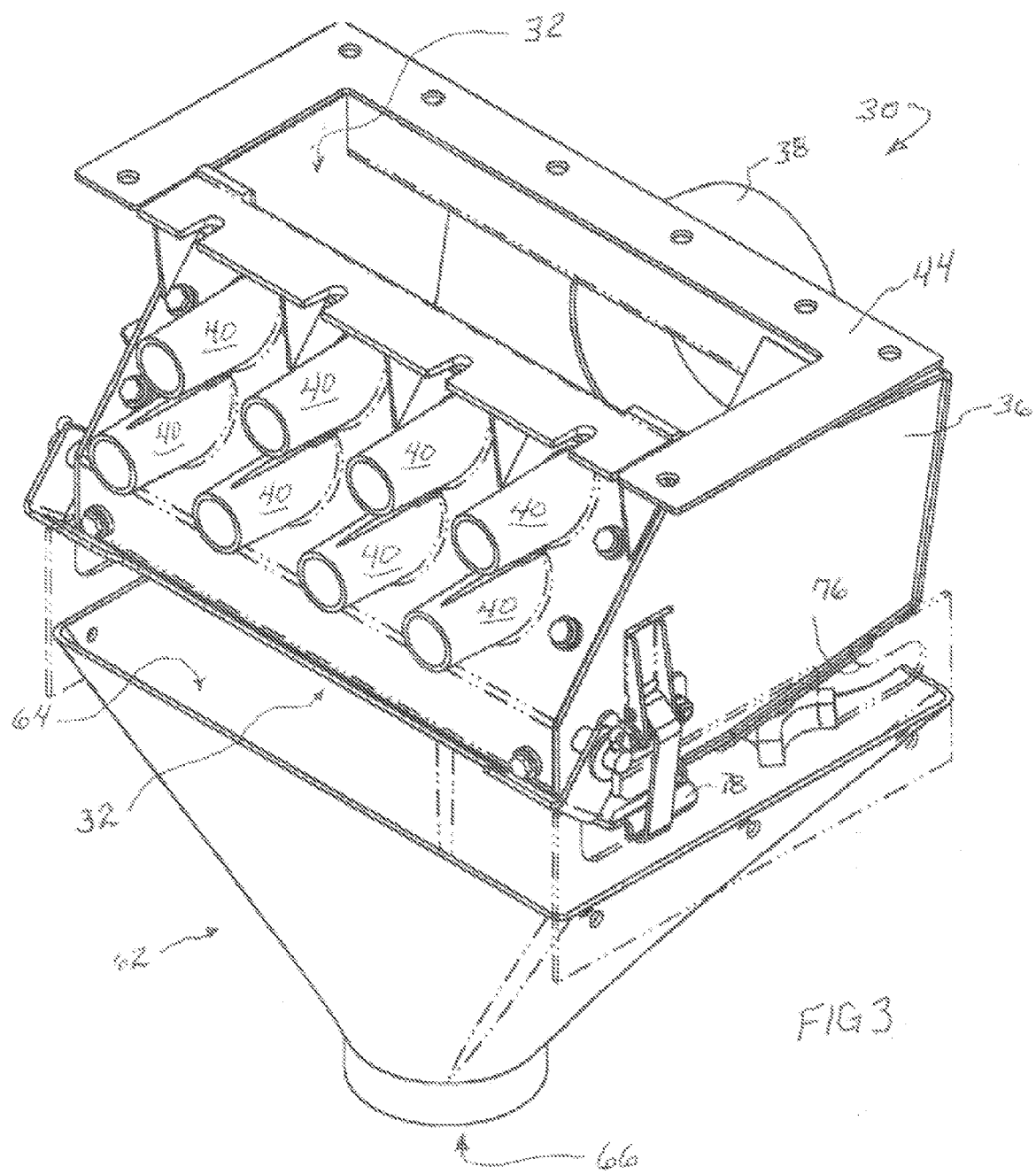

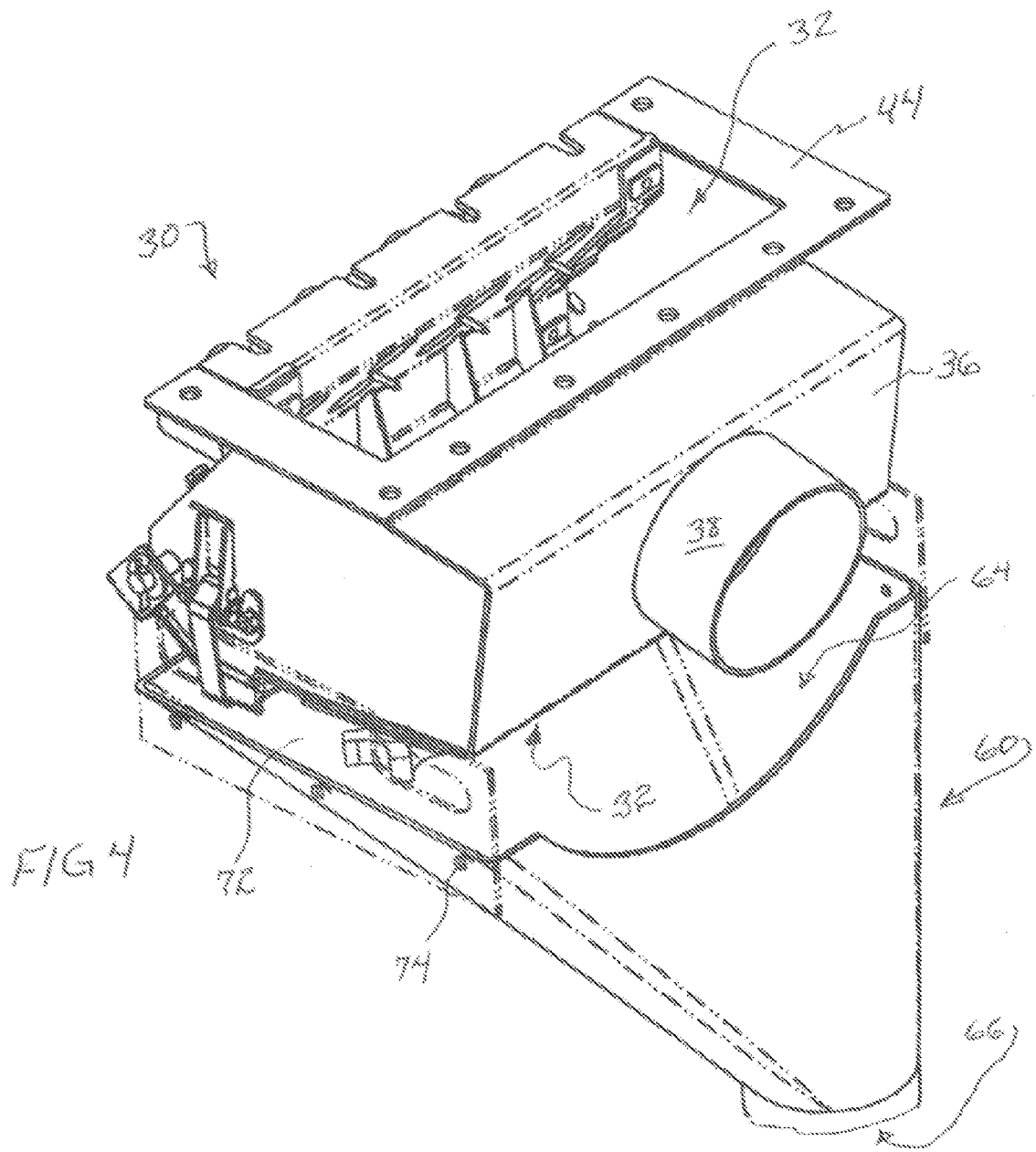

COLLAPSIBLE GRAIN CHUTE

CROSS REFERENCE TO RELATED APPLICATIONS

This Patent Application is a Divisional of, and claims priority to under 35 U.S.C. §120, U.S. patent application Ser. No. 10/855,266, filed on May 27, 2004, now U.S Pat. No. 7,156,029, entitled, "Collapsible Grain Chute" and having Travis Harnetiaux as the Inventor. The full disclosure of U.S. patent application Ser. No. 10/855,266 is hereby fully incorporated by reference.

BACKGROUND OF THE INVENTION

In general terms, the instant invention relates to an agricultural seed planter, and more particularly to a grain chute for attachment the bulk seed assembly distributor of a seed planter to improve the cleanout process when either changing the variety of seed being planted or prior to seasonal storage of the unit.

By and large, modern agricultural seed planters employ a plurality row dispensing bins, each of which has an associated metering device for applying preselected quantities of the seed to the land. These individual bins generally have limited storage capacity, for example one to three bushels, and therefore require frequent refilling. To avoid the lost time and excess fuel usage associated with frequent refilling, apparatus was developed using a central bulk supply of seed carried by the frame of the planter so that the dispensing bins can be resupplied with seed during operation in the field. A seed distribution system in which grain is conveyed from a main hopper can be seen in U.S. Pat. No. 5,161,473. This system utilizes a single main hopper which dispenses seed to a plurality of individual or mini-hoppers that each, in turn, supply seed to an individual row planting mechanism. The seed is fed from the main hopper into each mini-hopper by entraining it in an air stream contained in separate, individual transfer hoses that are connected between the main tank and each of the individual mini-hoppers.

U.S. Pat. No. 5,379,706 illustrates another seed planting system that also utilizes a central storage hopper for supplying a plurality of smaller, satellite hoppers via a plurality of individual hoses or tubes running from the central hopper to each of the individual satellite, row hoppers. Thus, while the systems of the '473 and '706 patents provide for the maintenance of seed supply quantities in the row hoppers during seeding operations, they also require the incorporation of a large number of separate seed transport tubes in those systems where multiple, mini-hoppers are present.

The '473 and '706 patents are merely illustrative of the general type of seeder relevant to the instant invention. There are many improvements or alternative arrangements available today on the market, but all "air seeders" generally work on the same or similar principles. A bulk storage bin, supported by the planter frame, feeds seed via gravity into a manifold-like distributor, located below the storage bin, where the seeds are air pushed into a multiplicity of outlets through individual hoses to the satellite hoppers. In some instances, more than one bulk storage bin, most often two, is used, each feeding a separate portion or section of the mini-hoppers.

Some difficulties and shortcomings have been identified in the field operation of systems such as described above, particularly when the bulk storage bins are to be emptied for end of the season storage or when making a change in the type or variety of seed being planted. To completely empty the bulk storage bin the operator must either remove the distributor or the bottom enclosure cover thereof and catch the extra grain in a sack or sacks. This is a somewhat difficult task in that the sack may become full, requiring quick replacement, or may have an inadequately small opening, allowing seed to miss the sack and fall directly on the ground.

It would be quite advantageous to have a means for fully and conveniently emptying the bulk bins of a seed planter without losing expensive seed or creating an over planted area in the field.

SUMMARY OF THE INVENTION

Accordingly, it is an object of the instant invention to provide an attachment to the bulk seed distributor of a seed planter that greatly improves the ability to effectively and efficiently empty the bulk seed bin.

It is another object of the instant invention to provide a grain chute for the bulk seed distributor of a seed planter that ensures effective and efficient elimination of seed materials from the bulk seed bin.

It is a further object of the instant invention to provide a collapsible grain chute for the bulk seed distributor of an agricultural seed planter that promotes the effective and efficient emptying of the bulk seed bin of the planter.

It is a still further object of the instant invention to provide a collapsible grain chute with a conical shape that affixes to the bulk seed distributor of an agricultural seed planter to provide effective and efficient emptying of the bulk seed bin of the planter.

It is an even still further object of the instant invention to provide a collapsible grain chute, made of a flexible cloth-like material, that affixes to the bulk seed distributor of an agricultural seed planter to provide effective and efficient emptying, via gravity, of the bulk seed bin of the planter.

It is another objected of the instant invention to provide a generally conically-shaped collapsible grain chute, with a cinch cord to selectively close the chute; the chute affixes to the bulk seed distributor of an agricultural seed planter to provide effective and efficient emptying of the bulk seed bin of the planter.

These and other objects are obtained by providing a generally conically-shaped collapsible grain chute affixed to the bulk seed distributor of an agricultural planter to provide an effective and efficient apparatus for emptying the bulk seed bin. The chute may include a cinch cord to selectively open and close the chute to control the flow of seed therethrough.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a rear perspective, partially exploded, view of a suitable distributor in combination with the collapsible chute of the instant invention; and FIG. 4 is a front perspective, partially exploded, view of the distributor/chute combination of the FIG. 3.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1A:
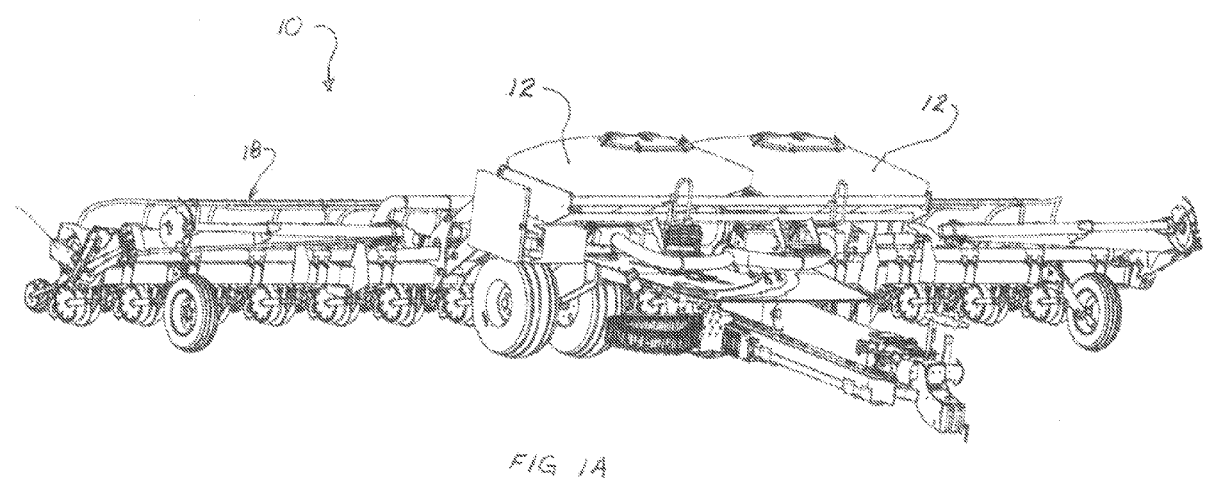
FIG. 1A is a front perspective view of an agricultural planter of the general type with which the instant invention may be used, showing, among other things, a pair of bulk seed bins and a plurality of satellite hoppers being fed therefrom.
Figure 1B:
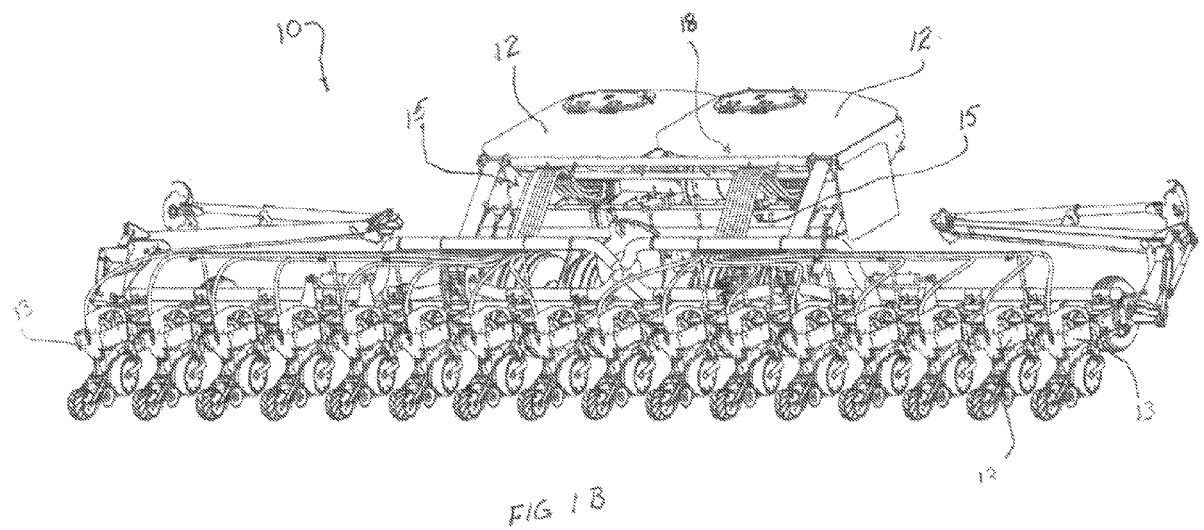
FIG. 1B is a rear perspective view of the planter of FIG. 1A.

FIGS. 1A and 1B show a pneumatic seed planting system (also known as an "air seeder") as it would be used in conjunction with the invention as described below. Reference numeral 10 indicates an agricultural planter which may be connected to a prime mover, such as a tractor, for transport through a field. The planter or seeder 10 is shown as having two bulk storage bins 12 and a plurality of individual distribution or row metering hoppers 13 that receive seed from the storage bins 12 by means of a distribution system indicated generally by the numeral 15. Generally speaking, storage bins 12 could have capacities ranging from 50 to about 340 bushels while the individual row hoppers would characteristically range from about one quart to three bushels in capacity. Each of the row metering bins 13 will have an associated seed metering device that applies the seed to the soil in a manner well-known in the industry. Each seed transport hose 18 is connected to supply seed to individual row hoppers. The ability of the system to supply seed to a comparatively large member of row hoppers is facilitated by the design of a single seed transport duct that is connected to a hopper 12 at one end and which extends from there outwardly over a series of row bins. The delivery system includes a source of air, such as blower, that is connected by air supply tubes to the bottom of storage bins 12. Air entering into the bin 12 picks up seeds and pneumatically transports them through hoses 18 into the inlet ends of a manifold supply hose. The planter can be of substantially any conventional design and configuration. FIGS. 1A and 1B depict the Case 1200 Series Advanced Seed Planter.

Figure 2:
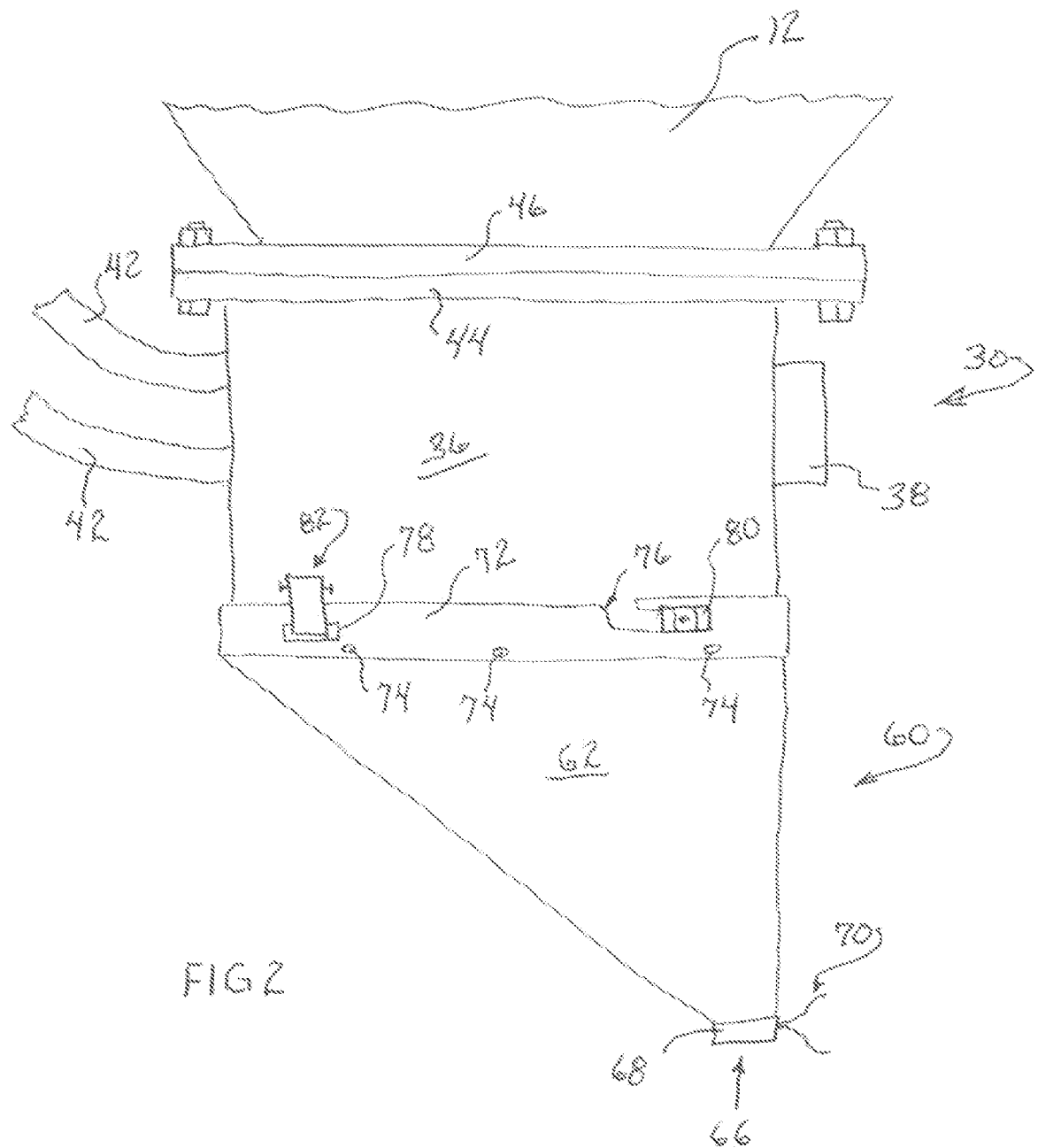
FIG. 2 is a left end view of a bulk seed distributor with the collapsible chute of the instant invention.

FIG. 2 is an end view of an exemplary bulk seed distributor 30 attached to bulk storage bin 12. The attachment location between these two components will normally be at the lowest point of bin 12 relative to the ground so that seeds in bin 12 will be encouraged to flow into the distributor by the force of gravity. Referring also to FIGS. 3 and 4, the distributor 30 can be seen to comprise, basically, a box-like enclosure with a top opening 32 in flow communication with storage bin 12 and an opposing bottom opening 34. During operation of the planter, opening 34 is normally closed by a generally flat plate (not shown) affixed in to the main generally rectangular body portion 36 of distributor 30. However, when the planter is to be cleaned or emptied of seed, the flat plate is removed and the collapsible chute 60 is attached to generally fully encompass opening 32.

Distributor 30 further includes an opening 38 in the forward wall for the insertion of pressurized air to assist in movement of seeds through the system. The wall opposite opening 38 is a manifold-like series of outlet connectors 40 to which hoses 42 are connected for distribution to row metering hoppers 13. Distributor 30 is affixed to bin 12 via flange 44 which mates with a matching flange 46 on bin 12 by bolts or other suitable mechanical mechanisms.

Collapsible chute 60 is comprised of a main body 62 that is generally shaped like a hollow truncated funnel terminating at the top end in a large inlet opening 64 generally the same shape and size of bottom opening 32 of distributor 30, and terminating at the bottom end in a smaller opening 66. Opening 66 may include a hem 68 with a cinch chord 70 (FIG. 2) therein to permit the opening 66 to be selectively closed. The main body 62 may be made of any flexible material with sufficient durability to withstand the conditions under which it must operate. For example, main body 62 may be made of canvas, nylon or other synthetic materials. As seen best in FIGS. 2-4, an elongated plate 72 is affixed to one end of main body 62, as by rivets through holes 74 and extends beyond the associated edge of main body 62. Plate 72 has a horizontal top-opening slot 76 therein and a protruding catch 78. A retaining member 80, affixed to main body 62 and protruding away therefrom is sized to allow slot 76 to slide over member 80 and moved into position to hold plate 72 in the operating location. An over-the-center latch 82 engages catch 78 to lock chute 60 into engagement with distributor 30. The opposing end of the chute 60 and distributor 30 are duplicates of the corresponding ends just described, but are not shown. Other latches and/or slot arrangements can be used effectively so long as one end of the chute can be generally fixed in position relative to the bottom opening 32 in distributor 30 and the opposing end pivoted and locked into operating position. Also, a cinch chord or a friction fit could be used to hold the chute in position. The location below the distributor in which the chute is maintained in operation is usually quite confined, so the pivot/locking arrangement is a significant practical feature. In some configurations, the bottom opening 32 may be centered axially with the inlet opening 64 of main body 62, i.e., it is axially symmetrical. In other situations, because of interference with other components in the general area, the bottom opening is offset, as shown in FIG. 2.

In operation, when it is necessary to empty the bulk storage bin 12, the bottom plate of distributor 30 is removed and the collapsible chute 60 is attached over the opening. The operator, by controlling the flow by opening and closing opening 66, allows the remaining seeds to flow into sacks or bags for later use or storage. When bin 12 is empty, the chute 60 is replaced by the bottom plate, and then put away in a storage box on the planter or tractor. Being flexible and not having a full rigid frame around the top end, the chute may be collapsed into a relatively small flat package, making storage more convenient and efficient.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. An agricultural seed planter, comprising:
a wheel-supported frame adapted for travel across a field and planting a plurality of rows of seeds;
a plurality of row planting units supported by said frame in a generally equally spaced manner transverse to the direction of travel;
each said row planting unit having a hopper associated therewith for feeding seed to the respective row planting unit;
at least one bulk seed storage bin supported on said frame, and having a size greater than that of each said hopper;
a distributor affixed to the bottom of said at least one bulk seed storage bin, said distributor being part of a seed distribution system that moves seeds from said bin to each said hopper such that a constant flow of seeds is maintained to said row planting units, wherein said box-like distributor has an open top in seed flow communication with said bin, and an opposing open bottom; and
a grain chute attached to said distributor, said chute comprised of a flexible truncated funnel-shaped body with a generally rectangular end attached to said distributor, enclosing said open bottom, and a spaced-apart smaller outlet, wherein said outlet is selectively changeable between open and closed conditions, and wherein said outlet has a cinch chord there around for selectively changing said outlet between open and closed conditions.

2. The planter of claim 1, wherein:
said flexible truncated funnel-shaped body is comprised of canvas.

3. The planter of claim 1, wherein:
said flexible truncated funnel-shaped body is comprised of nylon.

4. The planter of claim 1, wherein:
said distributor has at least one pin protruding therefrom on each of two opposing sides adjacent said open bottom; and
said chute includes a metallic frame at least partially enclosing said generally rectangular end and having holes therethrough that may be aligned with said at least one pin to attach said chute to said distributor.

5. The planter of claim 4, wherein:
said chute is comprised of flexible synthetic material; and
said truncated funnel-shaped body has a vertical axis extending therethrough and said outlet is offset therefrom.

6. The planter of claim 1, wherein:
said distributor has at least one pin protruding therefrom on each of two opposing sides adjacent said open bottom; and
said chute includes a metallic frame member on two opposing sides of said rectangular end and having top opening with horizontal slots extending therethrough that are configured to receive at least one pin to attach said chute to said distributor.

7. The planter of claim 6, wherein:
said distributor includes at least one over-the-center latch on each of said two opposing sides; and
each said metallic frame member includes a catch for engaging respective said over-the-center latches.

* * * * *